(12) United States Patent
Deering et al.

(10) Patent No.: US 6,535,220 B2
(45) Date of Patent: Mar. 18, 2003

(54) STATIC AND DYNAMIC VIDEO RESIZING

(75) Inventors: Michael F. Deering, Los Altos, CA (US); Nathanial D. Naegle, Pleasanton, CA (US); Mike Lavelle, Saratoga, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 86 days.

(21) Appl. No.: 09/758,535

(22) Filed: Jan. 10, 2001

(65) Prior Publication Data

US 2001/0048435 A1 Dec. 6, 2001

Related U.S. Application Data

(63) Continuation-in-part of application No. 09/251,840, filed on Feb. 17, 1999.
(60) Provisional application No. 60/074,836, filed on Feb. 17, 1998, and provisional application No. 60/175,384, filed on Jan. 11, 2000.

(51) Int. Cl.$^7$ .............................................. G06T 11/40
(52) U.S. Cl. ........................ 345/582; 345/587; 345/660
(58) Field of Search ................................ 345/582, 587, 345/418, 419, 660

(56) References Cited

U.S. PATENT DOCUMENTS

| | | | |
|---|---|---|---|
| 5,117,289 A | | 5/1992 | Farley et al. |
| 5,619,438 A | | 4/1997 | Farley et al. |
| 5,877,771 A | * | 3/1999 | Drebin et al. ................ 345/582 |
| 5,889,529 A | | 3/1999 | Jones et al. |

FOREIGN PATENT DOCUMENTS

| EP | 0 506 429 | 9/1992 |
|---|---|---|

OTHER PUBLICATIONS

SiliconGraphics Computer Systems Onyx2™ Technical Report, Aug. 1998, 84 pages.

* cited by examiner

Primary Examiner—Matthew Luu
(74) Attorney, Agent, or Firm—Jeffrey C. Hood

(57) ABSTRACT

A graphics system comprises a texture memory, a rendering engine, a sample buffer and a filtering engine. The rendering engine renders received primitives based on a render pixel array whose vertical and horizontal resolutions are dynamically programmable. The rendering engine determines render pixels that geometrically intersect a primitive. For each intersecting render pixel, a texture access may be required (if texture processing is turned on) to determine texture values. The texture values may be used to compute sample values at sample positions interior to the sample render pixel and the primitive. A controlling agent may decrease the vertical and horizontal resolutions of the render pixel array to control frame render time. The filtering engine may programmably generate virtual pixel centers covering the render pixel array. Any change in the render pixel resolutions may require an accommodating change in the virtual pixel array parameters.

10 Claims, 11 Drawing Sheets

STATIC AND DYNAMIC VIDEO RESIZING

CROSS-REFERENCE TO RELATED APPLICATIONS

This application claims the benefit of U.S. Provisional Application No. 60/175,384, filed on Jan. 11, 2000, and titled "Photorealistic Hardware Antialiasing".

This application is a continuation-in-part of application Ser. No. 09/251,840 filed on Feb. 17, 1999 titled "Graphics System With A Variable-Resolution Sample Buffer", which claims the benefit of U.S. Provisional Application No. 60/074,836 filed on Feb. 17, 1998 titled "UltraJava Graphics".

BACKGROUND OF THE INVENTION

1. Field of the Invention

This invention relates generally to the field of 3-D graphics and, more particularly, to a system and method for rendering and displaying 3-D graphical objects.

2. Description of the Related Art

Graphics systems operate on graphics primitives to generate video output pixels. Some prior art graphics systems are capable of rendering pixels at a first resolution (the render resolution) and interpolating the rendered pixels up to the resolution required by a display device (the output resolution). When the rate of primitives (and especially textured primitives) is high, the rendering hardware may not be able to maintain the frame rate required by the display device. Texture access bandwidth is quite often the main culprit. Thus, the rendering resolution may be decreased so the frame render time will drop to a value below the frame output period (i.e. inverse of video frame rate). Image quality suffers as the ratio of output pixels to render pixels drops. However, dropping frames is generally considered a much worse outcome than lowering image quality for a short while.

One such graphics system is the Infinite Reality® visualization system manufactured by SGI. The SGI system generates a number of supersamples per render pixel region, and applies a box filter to generate each render pixel from the samples in the corresponding render pixel region. The render pixels are then interpolated up to the video output resolution. While the SGI system employs supersampling, it is unfortunate that the high resolution supersample information must pass through a low-resolution immediate stage when the ultimate goal is an intermediate resolution video output. Thus, there exists a need for a system and method capable of (a) generating video output pixels directly from supersamples and (b) "dialing back" the resolution of render pixels to maintain the frame rate requirement especially when the primitive processing load in large.

SUMMARY OF THE INVENTION

A graphics system may, in some embodiments, may comprise a rendering engine, a texture memory, a sample buffer and a filtering engine. The texture memory may store texels (i.e. texture elements) to be applied to the surfaces of objects. The rendering engine receives a stream of graphics primitives, and renders the graphics primitives in terms of supersamples which are written into the sample buffer. The rendering computations are organized based on an array of render pixels. The rendering engine is configured to determine a collection of render pixels which geometrically intersect each primitive. For a given primitive, each intersecting render pixel is populated with a programmable number of sample positions, and sample values (e.g. color values) are computed at sample positions falling interior to the primitive. For render pixels that intersect textured primitives, rendering engine accesses texture memory to determine texture values that are to be applied in the sample value computations (on interior samples).

The horizontal resolution (i.e. the number of render pixels in the horizontal direction) and the vertical resolution (i.e. the number of render pixels in the vertical direction) of the render pixel array are dynamically programmable. Decreasing the render array resolutions implies fewer render pixels geometrically intersect the average primitive. This in turn implies that the number of texture accesses per frame and the number of intersecting render pixels per frame to be populated with samples decrease. Thus, after such a decrease in the render array resolutions, the rendering engine may render frames more quickly. Sample buffer 104 may store the array of render pixels, each render pixel containing a set of rendered supersamples.

The filtering engine scans through a virtual screen space (populated by the render pixels and their associated supersamples) generating virtual pixel centers which cover the render pixel array (or some portion thereof), and computing a video output pixel for each virtual pixel center based on a filtration of supersamples in a neighborhood of the virtual pixel center. Decreasing the render array resolutions implies that a numerically smaller set of render pixels carries the graphics content. In other words, the new render pixel array covers a smaller rectangle in the virtual screen space. Thus, the filtering engine may decrease the horizontal and vertical displacements between virtual pixel centers as well as the start position of the array of virtual pixel center centers so that they cover the new render pixel array. Furthermore, filtering engine may decrease the size of the filter support so that it covers a smaller area in virtual screen space but the same area in video output pixel space, and may similarly contract the filter function (or equivalently, expand arguments supplied to the filter function evaluation hardware) in accord with the contracted filter support.

A controlling agent (e.g. a graphics application, a graphics API and/or software algorithm running on a processor embedded in the graphics system) may be configured to gather rendering performance measurements from the rendering engine, and to generate an initial estimate of frame rendering time for a next frame based on the rendering performance measurements and the current values of the render resolutions. If the initial estimate for the frame rendering time is large enough relative to the frame time dictated by the output display, the controlling agent may decrease the horizontal and/or vertical resolution of the render pixel array. Thus, the frame render time for the next frame may attain a value smaller than the output frame time. Furthermore, the controlling agent may command the filtering engine to use correspondingly smaller values for the horizontal and vertical displacements between virtual pixels centers, a new value for the start position of the virtual pixels array, and correspondingly smaller dimensions for the filter support and filter function.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
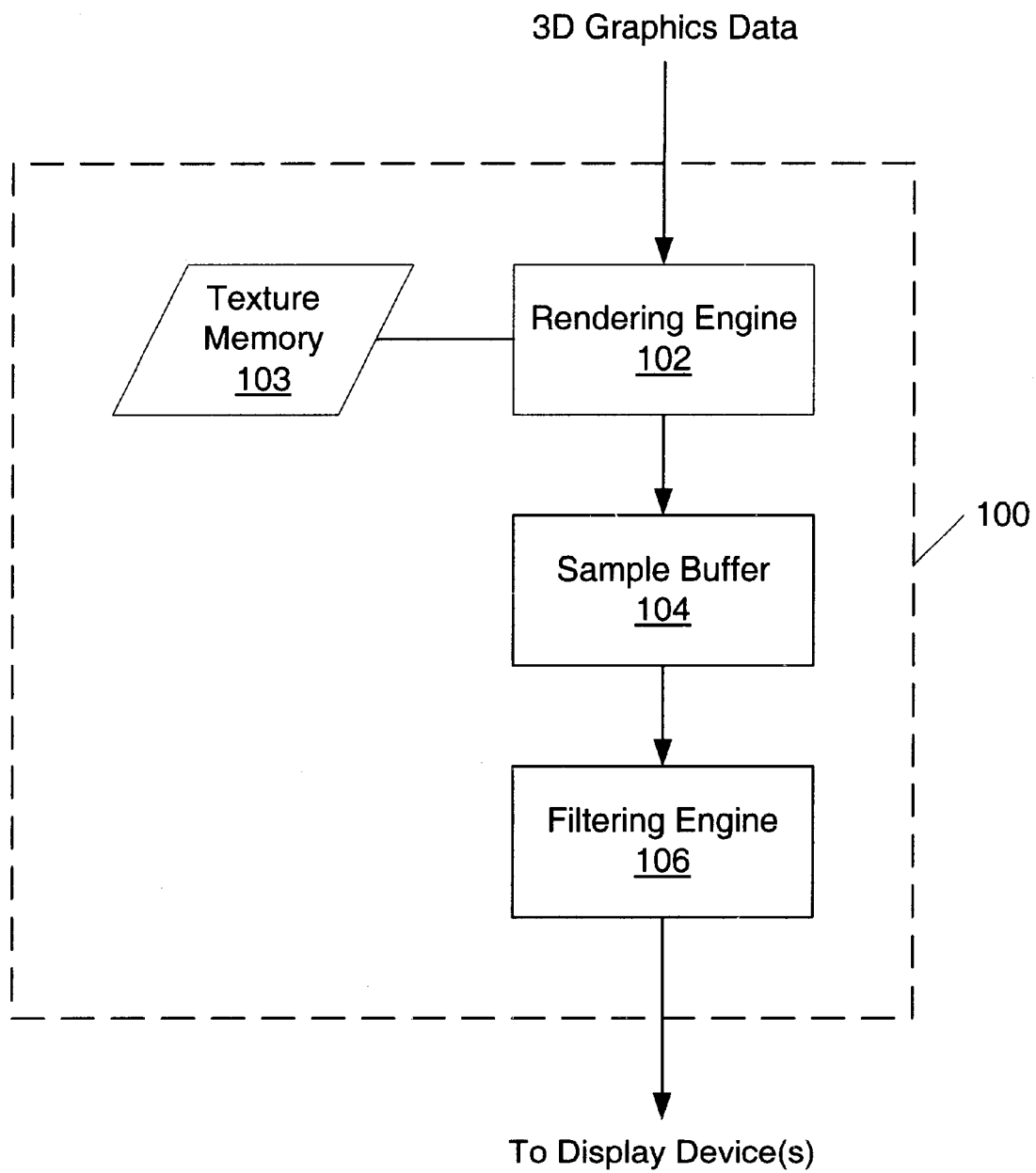
FIG. 1 illustrates one embodiment of graphics system configured to compute video output pixels by filtration of supersamples without an intervening filtration down to render pixel resolution.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Please note that the headings are for organizational purposes only and are not meant to limit the description or claims.

DETAILED DESCRIPTION OF SEVERAL EMBODIMENTS

FIG. 1—Graphics System 100

FIG. 1 illustrates one embodiment of a graphics system 100 configured generate one or more video signals in response to an input stream of 3D graphics data. Graphics system 100 may receive the 3D graphics data from a graphics API (i.e. an applications programmer's interface such as OpenGL®, Java 3D™, PHIGS or Renderman® running on a host computer system. For example, the graphics API may store the 3D graphics data in a system memory, and graphics system 100 may read the graphics data from the system memory. The graphics API may be controlled by a graphics application (e.g. a video game, flight simulator, a CAD application or a virtual reality application) also running on the host computer system.

The 3D graphics data may comprise a stream of graphics primitives. Examples of graphics primitives include polygons, parametric surfaces, splines, non-uniform rational B-splines (NURBS), sub-division surfaces, fractals, volume primitives, and particle systems. These graphics primitives are described in detail in the textbook entitled "Computer Graphics: Principles and Practice" by James D. Foley, et al., published by Addison-Wesley Publishing Co., Inc., 1996.

Graphics system 100 comprises a rendering engine 102, texture memory 103, sample buffer 104 and filtering engine 106. Rendering engine 102 operates on the graphics primitives to generate samples, and stores the samples in sample buffer 104. Filtering engine 106 reads samples from sample buffer 104 and filters the samples to generate one or more streams of video output. The one or more output video streams are transmitted to one or more display devices (e.g. monitors and/or projectors).

Rendering engine 102 may organize its generation of samples based on an array of render pixels. The render pixel array may have dimension $M_r \times N_r$, i.e. may comprise $M_r$ render pixels horizontally and $N_r$ render pixels vertically. Rendering engine 102 may be configured to generate a programmable number $N_{s/rp}$ of sample positions per render pixel. If a render pixel is found to intersect with a given primitive (e.g. polygon), rendering engine 102 may (a) generate $N_{s/rp}$ sample positions in the render pixel, (b) determine which of the sample positions fall inside the primitive, and (c) compute color information for the interior sample positions based on a spatial interpolation of the color values at the vertices of the primitive. It is noted that render array size parameters $M_r$ and $N_r$ and sample density parameter $N_{s/rp}$ may be changed on a per-frame basis. Furthermore, the size parameters $M_r$ and $N_r$ and the sample density parameter $N_{s/rp}$ may be varied independently. Step (c) is referred to herein as the "sample fill" process. Rendering engine 102 may perform some or all of the sample-fill processing using dedicated circuitry.

Furthermore, rendering engine 102 may conditionally perform texture processing on primitives in response to a texture state indicator. The texture state indicator may be stored in a register within graphics system 100. If the texture state indicator is false, rendering engine 102 may skip texture processing on primitives. If the texture state indicator is true, rendering engine 102 may access texture memory 103 to determine one or more texture values for each render pixel which intersects a current primitive.

For each intersecting render pixel, rendering engine 102 may generate $N_{s/rp}$ sample positions, determine which of the $N_{s/rp}$ sample positions are interior to the current primitive, and compute color information for the interior sample positions based on the one or more texture values associated with the render pixel as well as a spatial interpolation of vertex color values.

The graphics data stream received by rendering engine 102 may include a texture toggle command which toggles the texture state indicator. Thus, if a sequence of primitives are to be textured, a graphics application (or the graphics API) may compose the graphics data stream with a first texture toggle command followed by the sequence of primitives to be textured followed by a second texture toggle command, and transmit the graphics data stream to the rendering engine 102.

Sample buffer 104 may be double-buffered, i.e. may include two buffer segments. Thus, rendering engine 102 may write into one buffer segment, while filtering engine 106 reads from the other buffer segment. Filtering engine 106 is configured to compute a frame of video in constant time $T_{filter}$. (The frame time $T_{filter}$ may depend on the horizontal and vertical pixel resolutions of the video output frame). Thus, filtering engine 106 will generally be ready to switch buffer segments every $T_{filter}$ seconds.

In contrast, the time $T_{render}$ required for render engine 102 to complete the rendering of samples for a frame's worth of graphics data into the sample buffer may depend on factors such as (1) the number $N_{p/f}$ of primitives associated with the frame, (2) the number $N_{tp/f}$ of textured primitives associated with the frame, (3) the size $M_r \times N_r$ of the render pixel array to be used for the frame, and (4) the number $N_{s/rp}$ of supersamples to be generated per render pixel. If all of these numbers are large, rendering engine 102 may be pushed beyond the limit of its processing capacity, and the frame render time $T_{render}$ may exceed the frame filter time $T_{filter}$. Thus, filtering engine 106 may finish generating a video frame from buffer segment A before rendering engine 102 is ready to release buffer segment B. In this situation, filtering engine 106 may be configured to immediately read buffer segment A again, and generate another video frame from the same sample data. While the same sample data may be reused, this does not necessarily imply that filtering engine 106 will generate the same set of video output pixels because filtering engine 106 may be configured to vary the positions at which output pixels are computed in the sample space and the properties of the filter used to operate on the samples on a per-frame basis.

The number $N_{p/f}$ of primitives per frame and the number of $N_{tp/f}$ textured primitives per frame are beyond the control of rendering engine 102. The number $N_{p/f}$ of primitives per frame may be determined by actions of a user of the graphics application. For example, if the pilot of a flight simulator steers a virtual aircraft down towards the ground to strafe an enemy convoy, the graphics application may generate a large number of primitives per frame. Similarly, the number $N_{tp/f}$ of textured primitives per frame may be determined by user actions. For example, if the pilot directs his gaze towards the earth's surface from a high altitude, many of the primitives thus generated may be textured.

If the number $N_{p/f}$ of primitives for a current frame is anticipated to be large (e.g. based on statistics collected by rendering engine 102 on one or more previous frames), the graphics application (or the graphics API) may command rendering engine 102 to use smaller values for the render pixel array sizes $M_r$ and $N_r$ and/or the sample density $N_{s/rp}$ before sending the primitive data for the current frame.

In some embodiments, after clipping and perspective divide, what remains is a viewport with finite extent in the horizontal and vertical directions, e.g., with an extent which ranges from −1 to 1 in the horizontal coordinate x and from −1 to 1 in the vertical coordinate y. Rendering engine 102 may perform a transformation on primitives which maps the viewport onto the render pixel array (i.e. so as to exactly cover the render pixel array) as suggested in FIG. 2. For example, the viewport to render array mapping may be described by the following expression.

$$(x, y) \rightarrow \left( \frac{M_r}{2} x + \frac{M_r}{2}, \frac{N_r}{2} y + \frac{N_r}{2} \right).$$

Because the viewport maps onto the render pixel array, smaller values for the render array sizes $M_r$ and $N_r$ imply that each primitive (e.g. triangle) intersects fewer render pixels. Fewer intersecting render pixels implies fewer texture memory accesses, and also less computational burden on the sample-fill process if the sample density $N_{s/rp}$ remains constant. Thus, rendering engine 102 may more quickly complete rendering of the primitives for the current frame using the smaller render pixel array. In particular, the frame rendering time $T_{render}$ for the current frame may attain a value smaller than frame filter time $T_{filter}$. Maintaining this condition for every frame means that filtering engine 106 will not have to wait on rendering engine 102 to release a buffer segment, and thus, improves the quality of the displayed video output.

Figure 3:
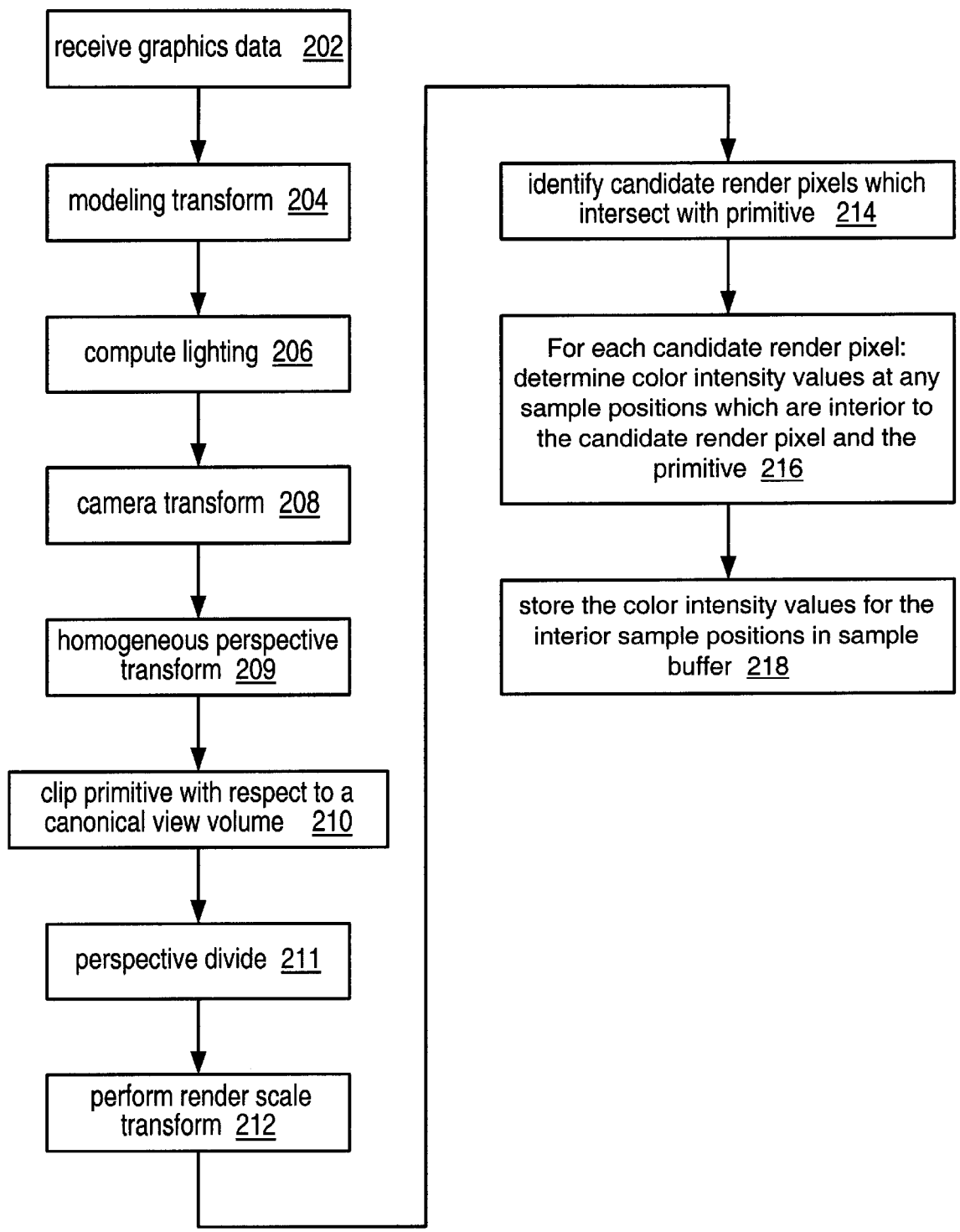
FIG. 3 illustrates one embodiment of a graphics pipeline for rendering supersamples in response to received graphics primitives.

FIG. 3 illustrates one embodiment of a computational pipeline implemented by rendering engine 102. In step 202, rendering engine 202 receives a stream of graphics data from an input port, and stores the graphics data in an input buffer. The graphics data includes a stream of graphics primitives.

In step 204, rendering engine 102 may access a primitive (e.g. a polygon) from the input buffer, and perform a modeling transformation on the primitive. The modeling transformation injects the primitive into a world coordinate system, and may be the composition of a series of transformations. For example, a primitive on the hand of a virtual human may be operated on by a modeling transformation which is the composite of (a) a first transformation designating the orientation of hand with respect to a forearm, (b) a second transformation designating the orientation of forearm with respect to upper arm, (c) a third transformation designating the orientation of upper arm with respect to torso, a fourth transformation designating the position and orientation of the torso with respect to the world coordinate system. Thus, the modeling transformation may require updating whenever any component in its composition chain changes. The modeling transformation may also include the transformation of any normal vectors associated with the primitive.

In step 206, rendering engine 102 may subject the primitive to a lighting computation. Lighting intensity values (e.g. color intensity values) may be computed for the vertices of polygonal primitives based on:

(1) the vertex normals;
(2) the position and orientation of a virtual camera in the world coordinate system (or two virtual cameras in the case of stereo video);
(3) the intensity, position, orientation and type-classification of light sources; and
(4) the material properties of the primitives such as their intrinsic color values, ambient, diffuse and/or specular reflection coefficients.

The vertex normals (or change in normal from one vertex to the next) may be provided as part of the graphics data stream, or may be computed from polygon normals. Polygon normals in turn may be computed from the vertices (e.g. based on a cross product). Rendering engine 102 may implement any of a wide variety of lighting models.

In step 208, rendering engine 102 may perform a camera transformation on the vertices of the primitive. The camera transformation may be interpreted as giving the coordinates of the primitive vertices with respect to a camera coordinate system which is rigidly bound to a virtual camera in the virtual world space. Thus, the camera transformation may require updating whenever the camera position and/or orientation changes. The virtual camera position and/or orientation may be controlled by user actions such as manipulations of a joystick. In some embodiments, the virtual camera orientation may be controlled by measurements of a user's head and/or eye orientation.

In step 209, rendering engine 102 may perform a homogenous perspective transformation to map primitives from the virtual world space into a clipping space. The homogeneous perspective transformation may map a 3D view volume (defined by the virtual camera position and view window in virtual world space) to a canonical view volume which is more convenient for the clipping computation.

In step 210, rendering engine 102 may perform a clipping computation on the primitive. In clipping space, the vertices of primitives may be represented as 4-tuples (X, Y, Z, W), and the clipping may be implemented by performing a series of inequality tests as follows:

T1=(−W≦X)
T2=(X≦W)
T3=(−W≦Y)
T4=(Y≦W)
T5=(−W≦Z)
T6=(Z≦0)

If all the test flags are all true, a vertex resides inside the canonical view volume. If any of the test flags are false, the vertex is outside the canonical view volume. An edge between vertices A and B is inside the canonical view volume if both vertices are. An edge can be trivially rejected if the expression Tk(A) OR Tk(B) is false for any k in the range from one to six. Otherwise, the edge requires testing to determine if it partially intersects the canonical view volume, and if so, to determine the points of intersection of the edge with clipping planes. A primitive may thus be cut down to one or more interior sub-primitives. Thus, rendering engine 102 may compute color intensity values for the new vertices generated by clipping.

In step 211, rendering engine 102 may perform a perspective divide on the homogenous post-clipping vertices (X, Y, Z, W) according to the relations x=X/W
y=Y/W
z=Z/W.

After the perspective divide, the primitives reside in a viewport square defined by the inequalities −1≦x≦1 and −1≦y≦1.

Figure 2:
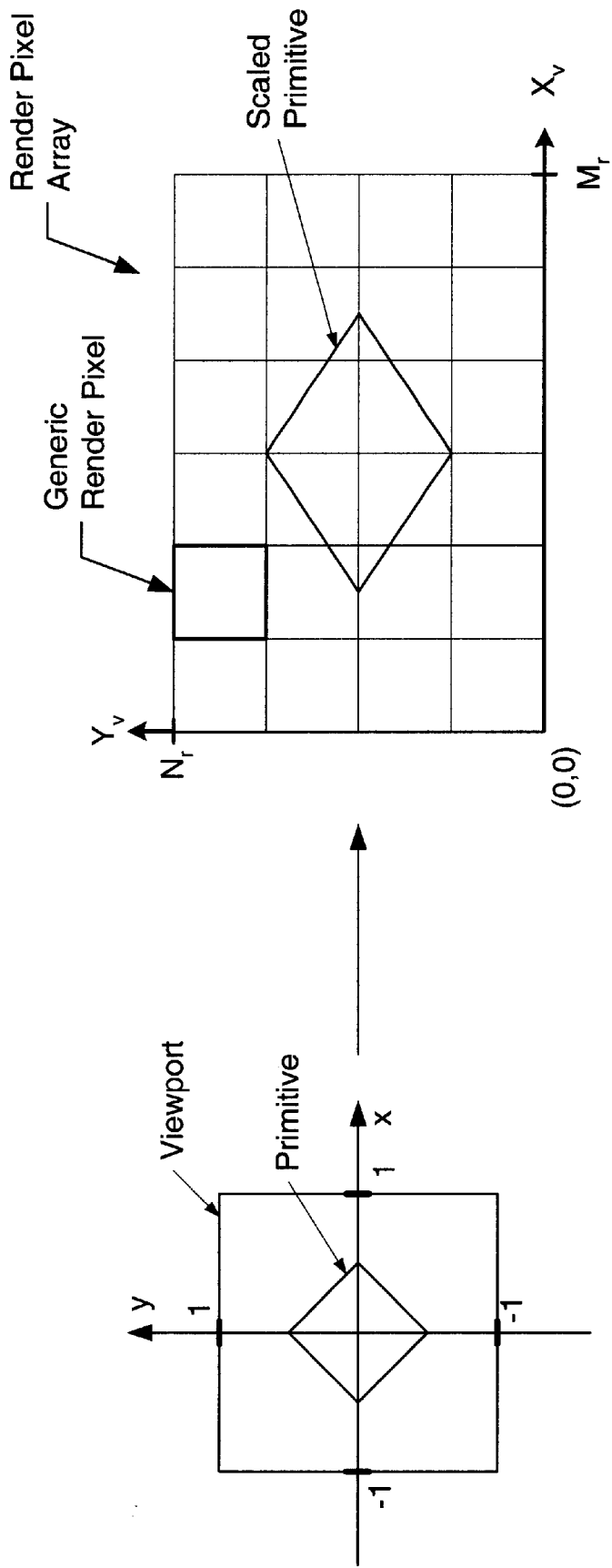
FIG. 2 illustrates a render scale transformation which transforms a post-clipping viewport onto a render pixel array in a virtual screen space according to one embodiment.

In step 212, rendering engine 102 may perform the render scale transformation on the post-clipping primitives as suggested by FIG. 2. The render scale transformation may map the viewport square in perspective-divided space onto the render pixel array in virtual screen space, i.e. onto a rectangle whose width equals the array horizontal resolution $M_r$ and whose height equals the array vertical resolution $N_r$. Let $X_v$ and $Y_v$ denote respectively the horizontal and vertical coordinate in the virtual screen space. It is noted that rendering engine 102 may be configured to map the viewport square onto a rectangular region which does not completely cover the render pixel array. The position and dimensions of the rectangular window may be defined by user input.

Figure 4:
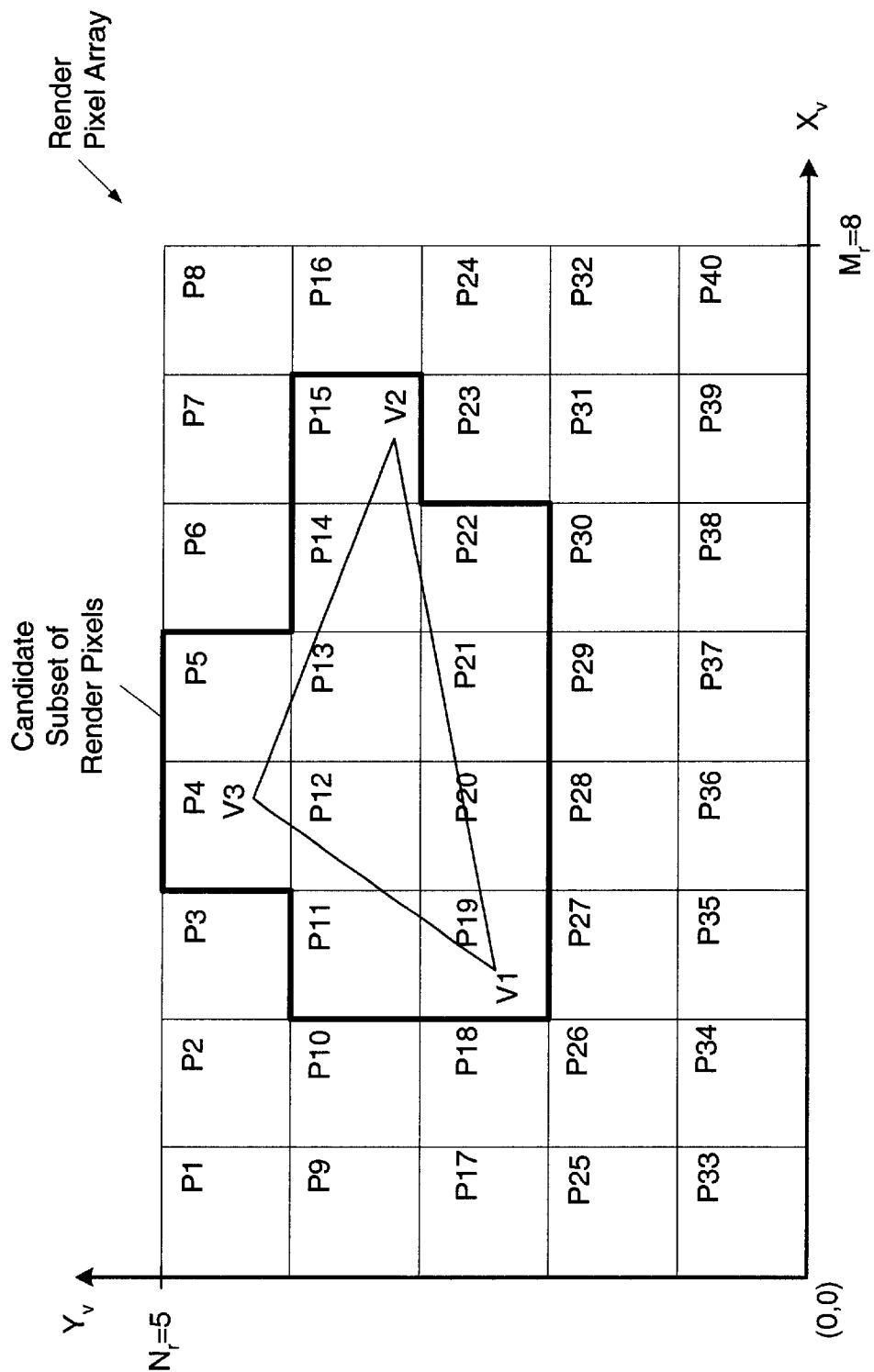
FIG. 4 illustrates an array of render pixels and a candidate subset of render pixels which geometrically intersect with a given primitive.

In step 214, rendering engine 102 may identify a subset of render pixels which geometrically intersect with the post-scaling primitive as suggested by FIG. 4. Render pixels in this subset are referred to as "candidate" render pixels or "intersecting" render pixels. It is noted that values $M_r$=8 and $N_r$=5 for the dimensions of the render pixel array have been chosen for sake of illustration, and are much smaller than would typically be used in most embodiments of graphics system 100.

Figure 5:
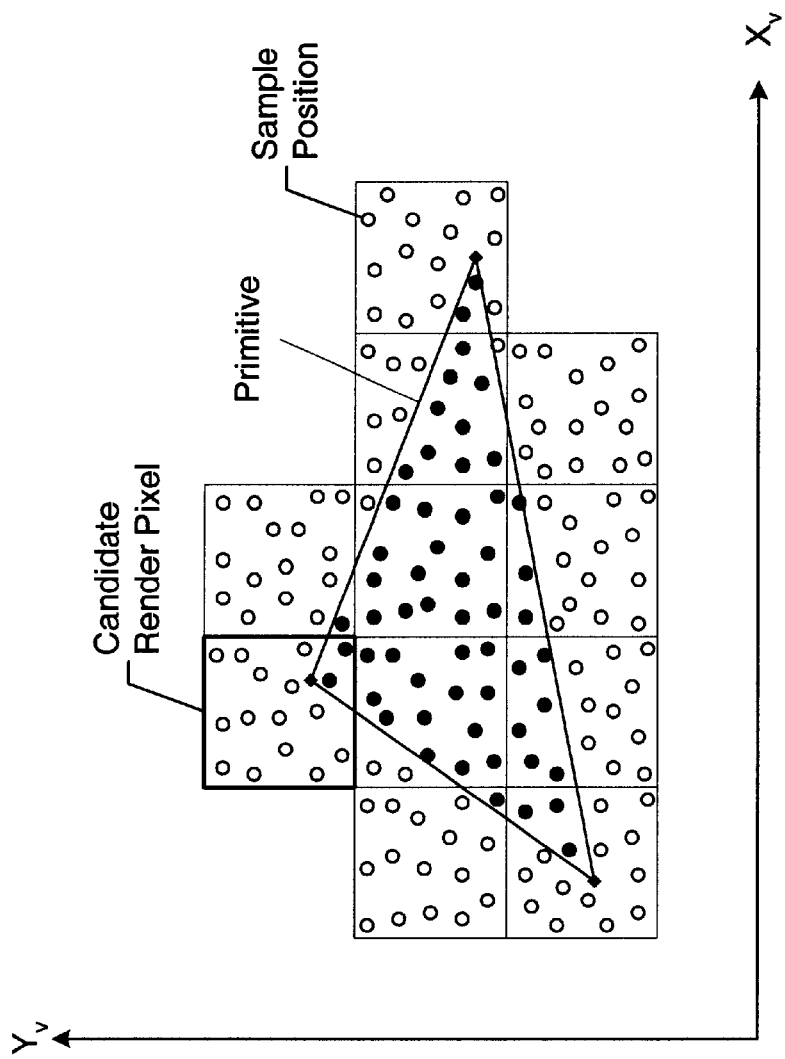
FIG. 5 illustrates the candidate render pixels populated with sample positions (e.g. stochastically distributed sample positions) and sample positions interior to the primitive denoted as black dots.

In step 216, rendering engine 102 may operate on each candidate render pixel by computing color intensity values at any sample positions which reside interior to the primitive and the candidate render pixel as suggested by FIG. 5. In FIG. 5, interior sample positions are denoted as small black dots, and exterior sample positions are denoted as small circles. Step 216 is described more elaborately below. In step 218, rendering engine 102 may store the computed color intensity values for the interior sample positions in sample buffer 104.

It is noted that steps 214 and 216 may be organized as a pipeline on render pixels, i.e. rendering engine 102 may feed a render pixel to step 216 as soon as it has been identified as a candidate (i.e. as intersecting the current primitive).

Figure 6:
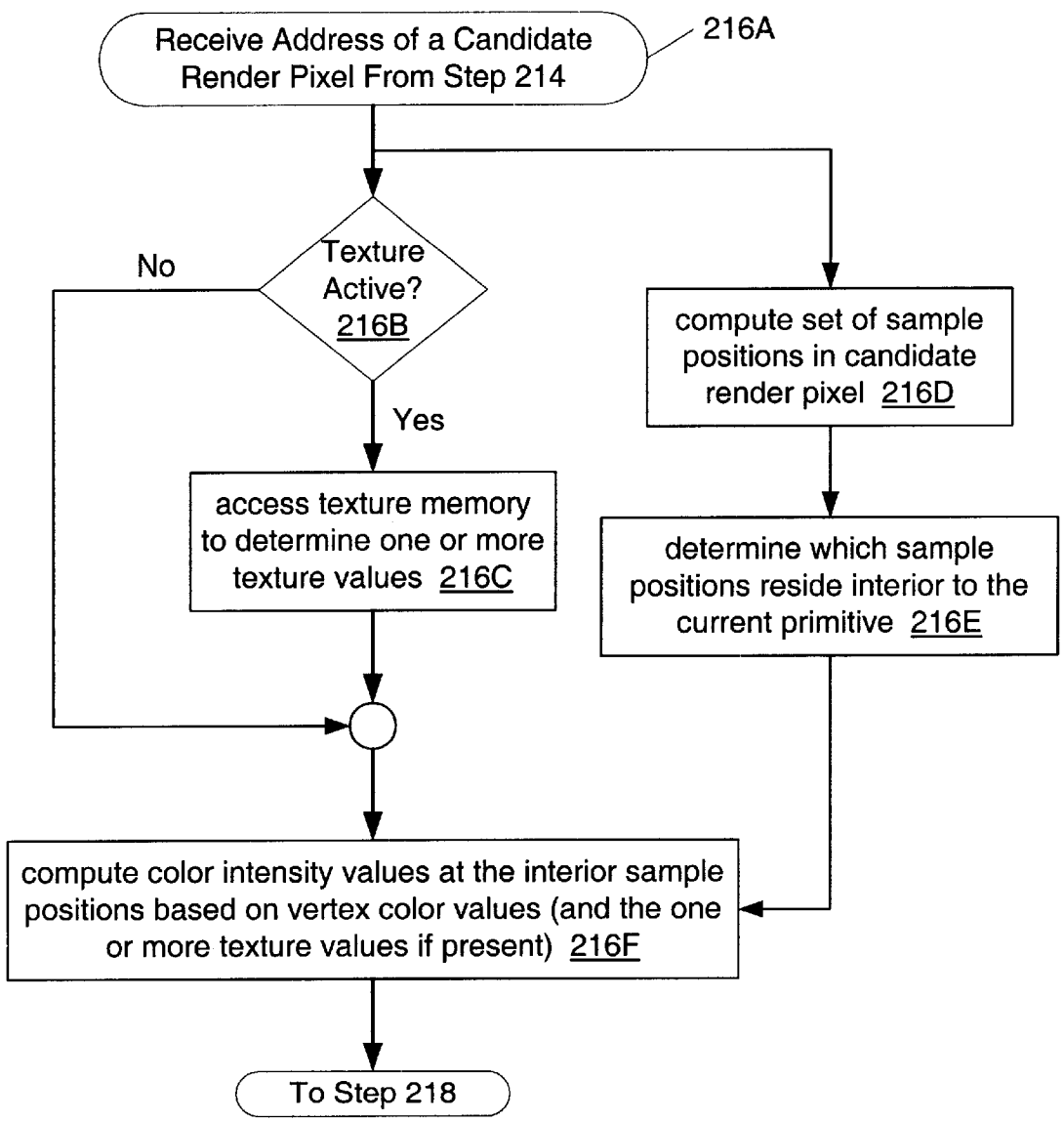
FIG. 6 is a flow diagram describing one embodiment of step 216 of FIG. 3, i.e. one embodiment of a method by which sample values may be assigned to interior sample positions of candidate render pixels.

FIG. 6 illustrates step 216 in more detail. In step 216A, rendering engine 102 may access an address of a candidate render pixel determined in step 214. In step 216B, rendering engine 102 may determine if the texture state indicator is true. If the texture state indicator is true, rendering engine 102 may perform step 216C. Otherwise, rendering engine 102 may skip step 216C and jump to step 216F.

In step 216C, rendering engine may access texture memory 103 to determine one or more texture values for the candidate render pixel. Texture memory 103 contains textures which are to be mapped onto objects (or portions of objects). Each texture may comprise an array of texels (i.e. texture elements). A texture may be organized as a MIP (multum in parvo—i.e. many things in a small place) map, where a fundamental texture image is represented as multiple different scales. Because textures are often applied to curved surfaces, the mapping from render pixel coordinates to texture coordinates is generally non-linear, and the centers of candidate render pixels typically do not map onto texel centers.

In one embodiment, rendering engine 102 may access a single texel which most closely maps onto the candidate render pixel. The single texel may store the one or more texture values to be used for computing sample color intensity values (see step 216F below).

In a second embodiment, rendering engine 102 may access a neighborhood (e.g. a two by two square) of texels containing the position corresponding to the candidate render pixel in texture space, and filter the texels of this neighborhood to determine the one or more texture values for the candidate render pixel.

In a third embodiment, rendering engine 102 may access a first neighborhood of texels containing the correspondent position of the candidate render pixel in a first MIP map level, and a second neighborhood of texels containing the correspondent position of the candidate render pixel in a second MIP map level. Rendering engine 102 may filter the texels from both neighborhoods to determine the one or more texture values for the candidate render pixel.

In step 216D, rendering engine 102 may compute a set of sample positions in the candidate render pixel. The sample positions may be generated according to a regular or pseudo-random pattern. In one embodiment, graphics system 100 includes a sample position memory which stores a list of horizontal and vertical sample positions offsets. The horizontal and vertical sample position offsets may be added to the origin of the candidate render pixel to generate the sample positions. The sample density parameter $N_{s/rp}$ determines the number of samples positions to be generated per candidate render pixel. The sample density parameter $N_{s/rp}$ may vary from one up to maximum value. In one embodiment the maximum value is sixteen. However, the maximum sample density may attain larger values at the expense of more sample processing hardware and/or more sample buffer memory.

In step 216E, rendering engine 102 may determine which of the sample positions in the candidate render pixel fall inside the current primitive. These sample positions falling inside the primitive will be referred to herein as "interior" sample positions.

It is noted that steps 216B and 216C may be performed in parallel with steps 216D and 216E.

In step 216F, rendering engine 102 may compute color intensity values for the interior sample positions of the candidate render pixel based on the vertex color values and also on the one or more texture values if texture processing step 216C was performed. Step 216F is referred to herein as the "sample-fill" computation. The present invention contemplates a wide variety of ways for performing the "sample-fill" computation. In one embodiment, the sample-fill computation may be programmable. Thus, a system designer/programmer may specify any desired functional combination of the vertex coordinates, vertex color intensity values, and one or more texture values to determine the sample color intensity values.

Figure 7:
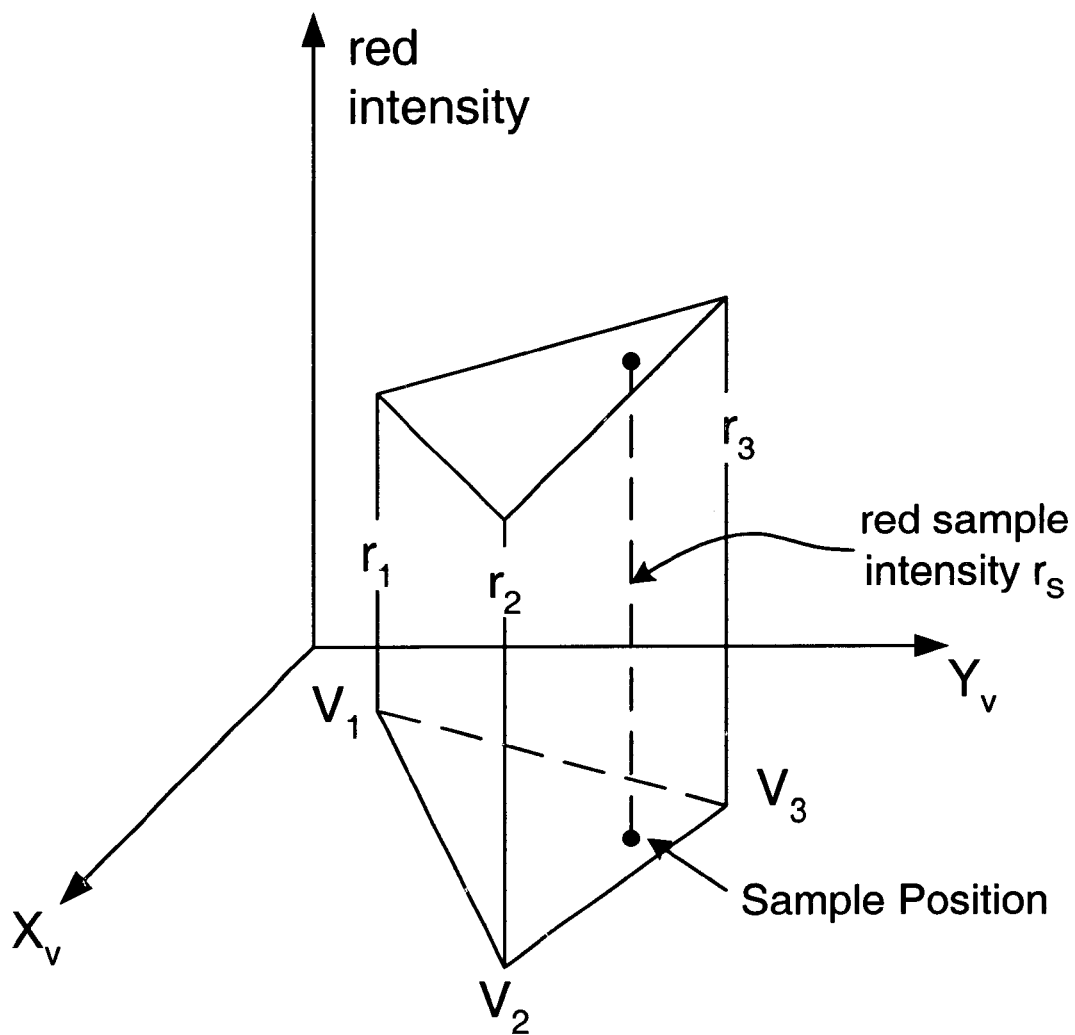
FIG. 7 suggests a linear spatial interpolation of a red intensity value for sample position interior to a triangle in the virtual screen space based on the red sample intensities at the vertices of a triangle.

In a second embodiment, rendering engine 102 may compute initial color values for the interior sample positions of the candidate render pixel based on a spatial interpolation of vertex color values as suggested by FIG. 7. FIG. 7 illustrates a linear interpolation of a red intensity value $r_S$ for a sample position inside the triangle defined by the vertices V1, V2 and V3 in virtual screen space (i.e. the horizontal plane of the figure). The red color intensity is shown as the up-down coordinate. Each vertex Vk has a corresponding red intensity value $r_k$. (The vertex color values are computed in the lighting computation 206). In this embodiment, three texture values may be determined (in step 216C) for the candidate render pixel, i.e. one for each color component. These texture colors may multiply the corresponding sample initial color values, i.e. textured color values for each interior sample of the candidate render pixel may be computed according to the relations Tred$_s$=(red texture value)($r_s$)

Tgreen$_s$=(green texture value)($g_s$)

Tblue$_s$=(blue texture value)($b_s$)

where ($r_s$, $b_s$, $g_s$) is the initial color intensity vector computed by spatial interpolation for the sample S. The textured sample color values may be further subjected to depth-cueing, fogging and/or the addition of a separately interpolated specular color.

Because the computation of texture values (step 216C) is performed once per intersecting render pixel per textured primitive, the time expended in accessing texture memory 103 per frame depends on the number $N_{tp/f}$ of textured primitives per frame, and the average number $N_{rp/pr}$ of intersecting render pixels per primitive. The average number $N_{rp/pr}$ of intersecting render pixels per primitive is an increasing function of the horizontal resolution $M_r$ and the vertical resolution $N_r$ of the render pixel array. If texture memory access bandwidth is becoming a bottleneck to rendering performance (e.g. based on values of $N_{tp/f}$ and $N_{rp/pr}$ in one or more previous frames), the graphics application and/or the graphics API may command rendering engine 102 to decrease the horizontal render pixel resolution $M_r$ and/or the vertical render pixel resolution $N_r$. By this means, the texture memory access bandwidth in succeeding frames may be sufficiently decreased so that the frame rendering time $T_{render}$ for the succeeding frames will fall under the frame filter time $T_{filter}$. Thus, filtering engine 106 will not be kept waiting for rendered frames.

In various situations, rendering performance may be limited by different portions of the graphics pipeline. For example, when the total number of primitives per frame, the average number of intersecting render pixels per primitive and the number $N_{s/rp}$ samples per render pixel are large, the sample test step 216E and/or sample fill step 216F may be bottlenecks in the pipeline. The strategy of decreasing the horizontal and/or vertical resolutions of the render pixel array not only decreases texture memory access bandwidth: it also serves to decrease the amount of sample test and sample fill processing required of steps 216E and 216F provided that the number $N_{s/rp}$ samples per render pixel is kept constant. In other words, the same strategy may be employed to control the texture memory access bandwidth and the sample test/fill processing load.

In some embodiments, rendering engine 102 may count the number $N_{irp/f}$ of intersecting (i.e. candidate) render pixels identified per frame. For example, this counting operation may be performed step 214 of FIG. 3. It is noted that a given render pixel may contribute to the count more than once because the render pixel may (and often does) intersect more than one primitive. The number $N_{irp/f}$ may be combined with the number $N_{tpr/f}$ of texture primitives per frame to determine a measure of the texture memory access bandwidth for the given frame, and may be provided to the graphics API. The graphics API may use the texture bandwidth measure to control the horizontal and vertical resolutions of the render pixel array. Alternatively, the graphics API may pass the texture bandwidth measure to the graphics application, and thus, the graphics application may use the texture bandwidth measure to control the horizontal and vertical resolutions of the render pixel array.

Figure 8A:
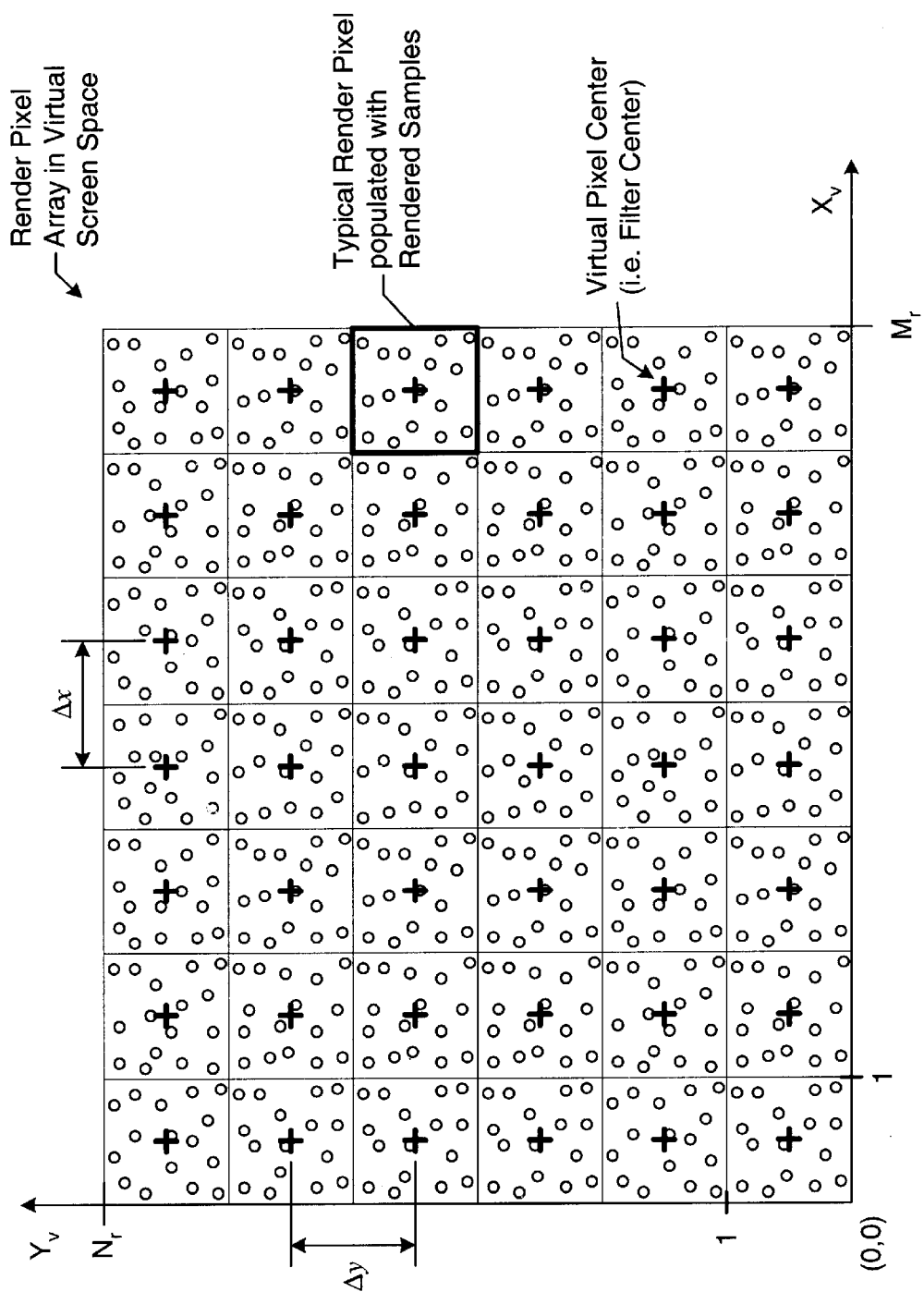
FIG. 8A illustrates the virtual screen space populated with samples organized as an array of render pixels, and an array of virtual pixel centers (i.e. loci for computation of video output pixels) superimposed on the render pixel array according to one set of embodiments.

When rendering engine 102 has completed the rendering of a frame into one of the buffer segments of sample buffer 104, filtering engine 106 may access the samples contained in the buffer segment and generate video output pixels from these samples. Each buffer segment of sample buffer 104 stores an $M_r \times N_r$ array of render pixels. Each render pixel stores $N_{s/rp}$ samples. Recall that $M_r$, $N_r$ and $N_{s/rp}$ are programmable parameters. Thus, the set of addresses represented by the render pixel array in the buffer segments may change from frame to frame. As suggested by FIG. 8A, filtering engine 106 may scan through virtual screen space in raster fashion (or a distorted raster fashion in order to compensate for display/projector distortions) generating virtual pixel positions denoted by the small cross markers, and generating a video output pixel at each of the virtual pixel positions based on the samples (small circles) in the neighborhood of the virtual pixel position. The virtual pixel positions are also referred to herein as filter centers since the video output pixels are computed by means of a filtering of samples. The virtual pixel positions form an array with horizontal displacement $\Delta X$ between successive virtual pixel positions in a row and vertical displacement $\Delta Y$ between successive rows. The first virtual pixel position in the first row is controlled by a start position ($X_{start}, Y_{start}$). The horizontal displacement $\Delta X$ and vertical displacement $\Delta Y$ and the start coordinates $X_{start}$ and $Y_{start}$ are programmable parameters. FIG. 8A illustrates a virtual pixel position at the center of each render pixel. This implies that the horizontal and vertical displacements of the virtual pixel array equal one, and the start position equals (½, ½). However, this arrangement of the virtual pixel positions (at the centers of render pixels) is a special case. More generally, the horizontal displacement $\Delta x$ and vertical displacement $\Delta y$ may be assigned values greater than or less than one.

Figure 8B:
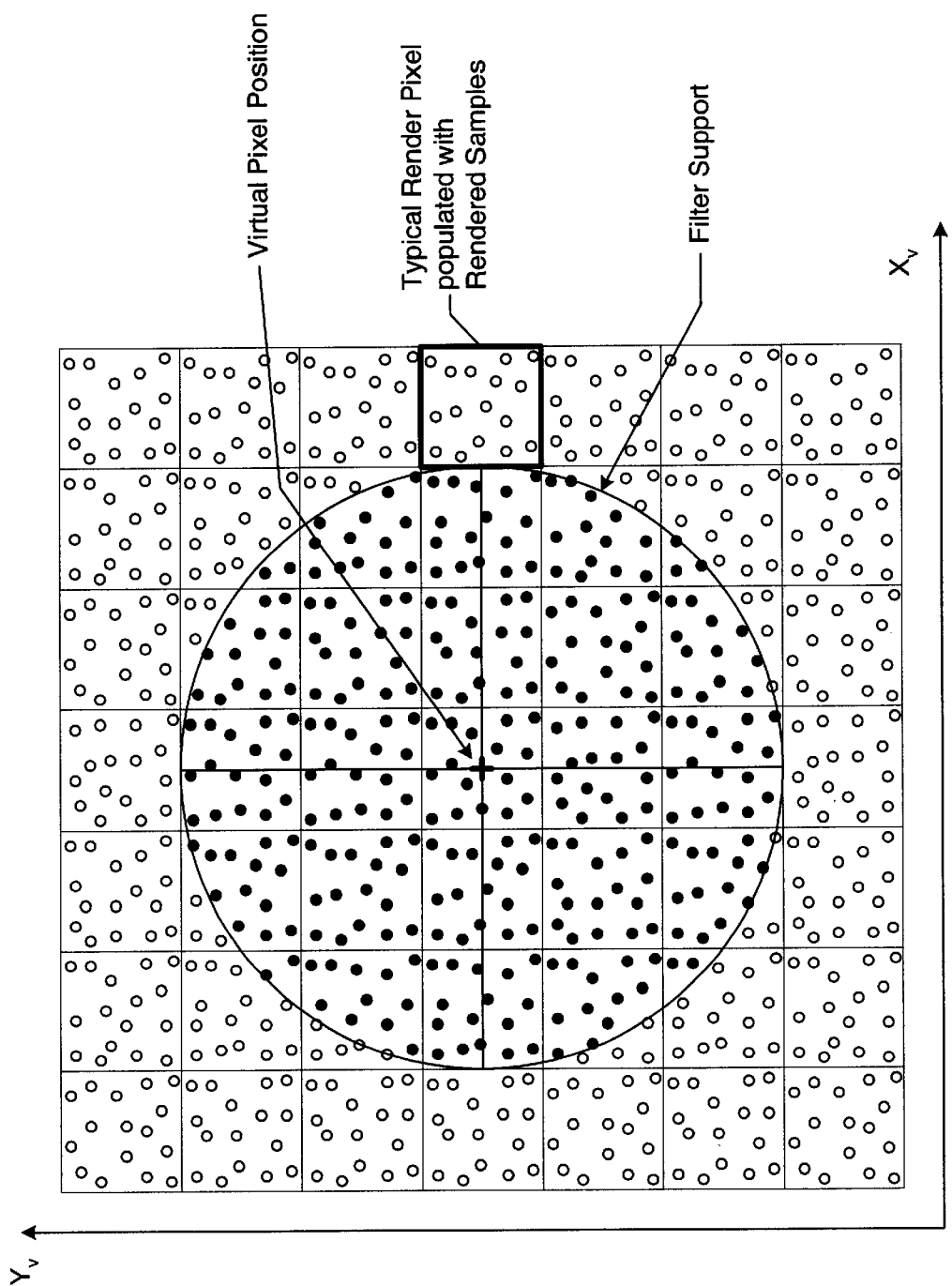
FIG. 8B illustrates the computation of a single video output pixel based on a filter with circular support according to one set of embodiments.

FIG. 8B illustrates the computation of a video output pixel at a particular virtual pixel position. Filtering engine 106 computes the video output pixel based on a filtration of the samples falling within a filter support region centered on the virtual pixel position. Each sample S falling within the filter support may be assigned a filter coefficient $C_S$ based on some function its position (e.g. its delta x and delta y, or, its radius, square radius, $L^1$ norm or $L^{infinity}$ norm) with respect to the virtual pixel position. The filter coefficient may be determined by table lookup and/or by computational evaluation of the filter function from a set of characterizing parameters. In one embodiment, the square radius of a sample with respect to the virtual pixel position is determined by adding the squares of the sample's delta x and delta y with respect to the virtual pixel position. The square radius may be converted into a stubby floating point format and the stubby floating-point square radius may be used to access a filter coefficient table.

Filtering engine 106 may use any of a variety of filters either alone or in combination to compute pixel values from sample values. For example, filtering engine 106 may use the box filter, the tent filter, the cone filter, the cylinder filter, the Gaussian filter, the Catmull-Rom filter, the Mitchell-Netravali filter, the windowed sinc filter, or in general, any form of bandpass filter or any of various approximations to the sinc filter.

The color components of the video output pixel may be computed based on a spatial convolution (or more general filtering) of the samples falling inside the filter support. (The samples falling inside the filter support are denoted as black dots while the exterior samples are denoted as small circles.) For example, filtering engine 106 may compute a red value $R_p$ for the video output pixel P based on the relation $$R_p = \frac{1}{E} \sum C_S R_S,$$

where the summation includes one term for each sample S interior to the filter support, where $R_S$ is the red sample value of the sample S. Similar summations may be used to compute the other color components and perhaps non-color components (such as α) of the video output pixel based on the corresponding components of samples.

The value E is a normalization value that may be computed according to the relation $$E = \Sigma C_S,$$

where the summation includes one term for each sample S falling in the filter support. The summation for the normalization value E may be performed in parallel with the red, green, blue, and/or alpha pixel value summations. Filtering engine 106 may include one or more dedicated chips optimized for performing the coefficient lookups, the coefficient-color (or coefficient-alpha) multiplications, the summations of the resultant products and the coefficient values, the reciprocation of the normalization constant E, and multiplication of the various summations by (1/E).

The filter support is illustrated in FIG. 8B as a circular disk with diameter equal to 5 render pixels. In one embodiment, the radius of the circular support is a programmable parameter which may be adjusted dynamically (i.e. per frame). In a second embodiment, the circular disk represents a special case in a family of ellipses having major and minor axes along the coordinate axes. In this embodiment, the horizontal and vertical diameters (or radii) of the support ellipse are programmable and dynamically adjustable. In a third embodiment, the filter support may be a rectangle whose height and width are programmable and dynamically adjustable. In a fourth embodiment, the support geometry and support size (e.g. vertically, horizontally and/or radially) may be programmable and dynamically adjustable.

As mentioned above, in order to generate a frame of video output, filtering engine 106 may scan through the virtual screen space generating an array of virtual pixel positions and computing pixel components (e.g. red, green, blue and alpha) at each of the virtual pixel positions. Let $M_f$ denote the number of virtual pixel positions in the horizontal direction, and $N_f$ denote the number of virtual pixel positions in the vertical direction. The video output for a given frame may be generated by filtering engine 106 according to the following pseudo-code fragment.

```
I=0;
J=0;
X^r=X_start;
Y^r=Y_start;
while (J<N_f) {
    while (I < M_f) {
        PixelValues = Convolve (X^r,Y^r);
        Output PixelValues;
        X^r = X^r+ΔX ;
        I = I + 1;
    }
    X^r=X_start;
    Y^r=Y^r+ΔY ;
    J=J+1;
}
```

The index I is a horizontal index. The index J is a vertical index. Recall that the point ($X_{start}$, $Y_{start}$) defines the start position in the virtual screen space for the array of virtual pixel positions. The function Convolve represents the filtration of samples in the neighborhood of the current virtual pixel position ($X^r$, $Y^r$) to determine the components (e.g. color) of the current output pixel as described above in connection with FIG. 8B. Once computed, the pixel values may be output to a display device (e.g. a projector or monitor). The inner loop generates successive virtual pixel positions within a single row. The outer loop generate successive rows. The above fragment may be executed once per video frame. It is noted that the virtual pixel array parameters $X_{start}$, $Y_{start}$, ΔX, ΔY, $M_f$ and $N_f$ are programmable and dynamically adjustable. Thus, graphics system 112 may be configured to support arbitrary video formats and arbitrary virtual pixel densities (in the virtual screen space) by appropriate choice of the array parameters.

Figure 8C:
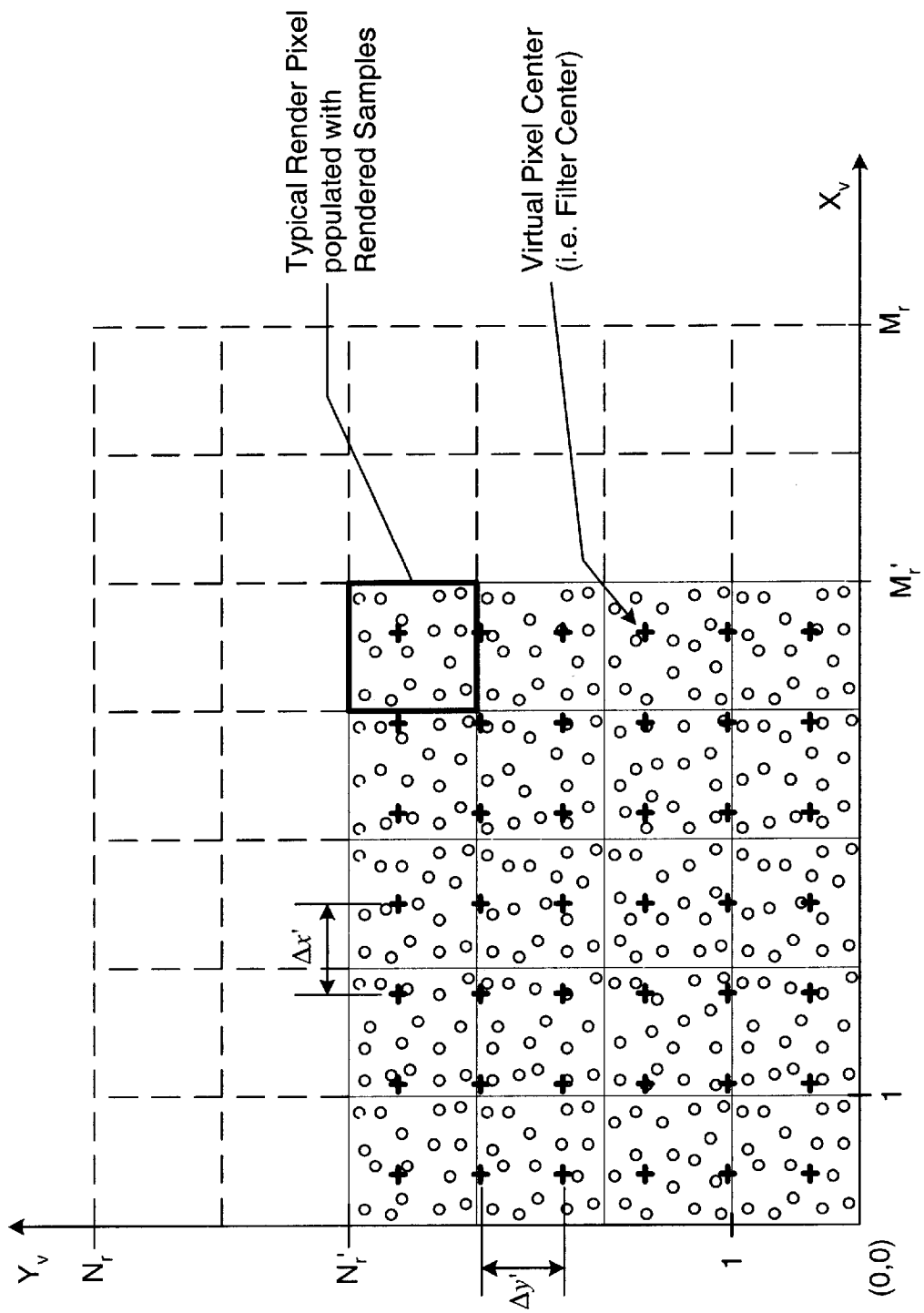
FIG. 8C illustrates a smaller render pixel array in the virtual screen space, and a contraction of the virtual pixel array to fit within the smaller render pixel array according to one set of embodiments.

Because one output pixel is computed at each virtual pixel position, the horizontal resolution $M_f$ and vertical resolution $N_f$ of the virtual pixel array are equal to the corresponding resolutions of the video output pixel array. The horizontal and vertical resolution of the video output pixel array are typically determined by the display device (e.g. monitor/projector) that is being driven. Thus, parameters $M_f$ and $N_f$ may remain constant in a given graphics session. As mentioned above, a controlling agent (such as the graphics API, graphics application or software executing in the graphics system 100) may decrease the horizontal resolution $M_r$ and/or the vertical resolution $N_r$ of the render pixel array in order to decrease the frame rendering time $T_{render}$. FIG. 8C illustrates the new render pixel array after such a decrease in resolutions relative to the initial render pixel array of FIG. 8A. The horizontal resolution $M_r'$ and vertical resolution $N_r'$ of the new render pixel array are smaller than the initial horizontal resolution $M_r$ and initial vertical resolution $N_r$ respectively. Recall that the render scale transformation, operating with the new resolution values, maps the graphics content of the viewport into the numerically smaller render pixel array. Thus, the filtering engine 106 must adjust the array of virtual pixel positions to fit within the new render pixel array. For example, the new virtual pixel positions may be positioned at locations (X, Y) defined by $$X=(M_r'/M_f)I+(M_r'/2M_f),$$

$$Y=(N_r'/N_f)J+(N_r'/2N_f),$$

where I runs from 0 to $M_f-1$ and J runs from 0 to $N_f-1$. This may be achieved by setting the new horizontal virtual pixel displacement $\Delta X'$ equal to $(M_r'/M_f)$, the new vertical virtual pixel displacement $\Delta Y'$ equal to $(N_r'/N_f)$ and the virtual array start position $(X_{start}, Y_{start})$ equal to $(M_r'/2M_f, N_r'/2N_f)$.

Furthermore, the filter support may be contracted horizontally and vertically so that the filter support covers the same region in the video output coordinate space (I, J). For example, in embodiments that support elliptical filter supports, the new horizontal support diameter $dSupp_H'$ and new vertical support diameter $dSupp_H'$ may be set according to the relations $$dSupp_H'=(dSupp_H)(M_r'/M_f),$$

$$dSupp_V'=(dSupp_V)(N_r'/N_f),$$

where $dSupp_H$ and $dSupp_V$ are the initial (or nominal) horizontal and vertical support diameters respectively. In the embodiment of FIG. 8B, $dSupp_H=dSupp_V=5$.

In some embodiments, only circular filter supports are supported. Thus, the filter support may only be adjusted in its radial dimension. In this case, the controlling agent may decrease the render resolutions in such a way that the aspect ratio of the initial render pixel array and the new render pixel array are the same (or approximately the same), i.e. $M_r'/N_r'=M_r/N_r$. Furthermore, the nominal render pixel resolutions $M_r$ and $N_r$ may be set equal to the video output resolutions $M_f$ and $N_f$ respectively. Thus, the horizontal and vertical scaling factors $(M_r'/M_f)$ and $(N_r'/N_f)$ are equal, and therefore, a radial contraction of the filter support suffices.

In addition to the filter support, the filter function may be contracted horizontal, vertically and/or radially. In those embodiments, that employ a lookup table based on radius (or square radius), a radial contraction of the filter function may be achieved by multiplying the radius (or square radius) of a sample with respect to a virtual pixel center by an appropriate contraction factor before accessing the lookup table. More generally, a filter function f(r) may be contracted radially by multiplying its argument r by constant greater than one and then evaluating f(kr) with k>1. Similarly, a filter function f(dx, dy) may be contracted horizontally and vertically by multiplying arguments dx and dy respectively by constants $k_x$ and $k_y$ greater than one and then evaluating $f(k_x dx, k_y dy)$.

Figure 9:
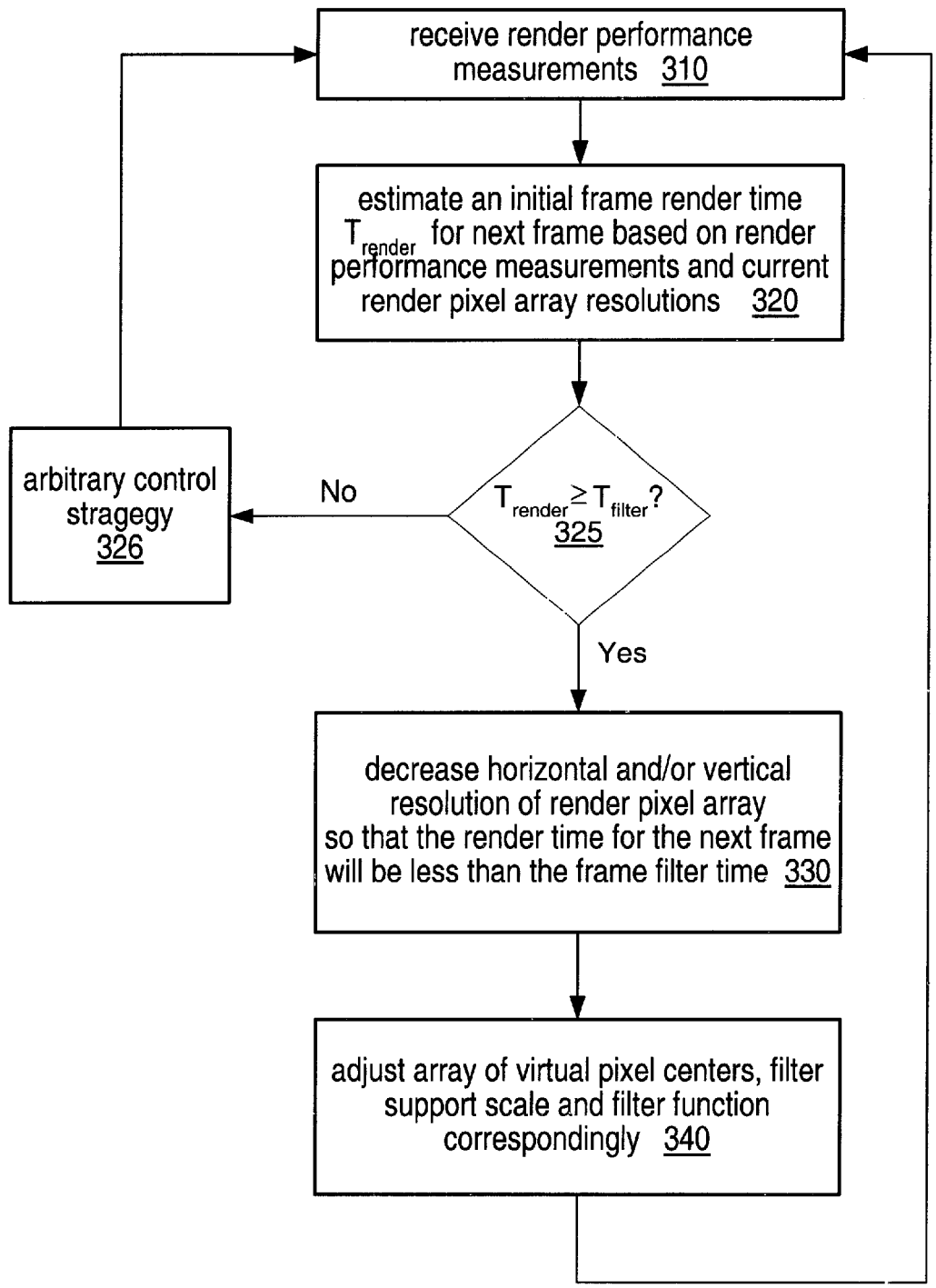
FIG. 9 illustrates one set of embodiments of a method for controlling rendering performance of graphics system 100.

In some embodiments, the controlling agent (e.g. the graphics API, the graphics application and/or control software executing in graphics system 100) may be configured to control the performance of graphics system 100 according to the flow diagram of FIG. 9. In step 310, the controlling agent may receive render performance measurements gathered by rendering engine 102 or the graphics API. The render performance measurements may include counts of (a) the number of primitives rendered per frame, (b) the number of textured primitives rendered per frame, (c) the number of candidate (i.e. intersecting) render pixels processed per frame, (d) the number of textured candidate render pixels processed per frame, for one or more previous frames. The controlling agent may generate an initial estimate of the frame render time $T_{render}$ for the next frame based on the render performance measurements and the current values of the render pixel resolutions $M_r$ and $N_r$.

In step 325, the controlling agent may compare the initial estimate of the frame render time $T_{render}$ to the known frame filter time $T_{filter}$. If the initial estimate is greater than or equal to the frame filter time (or greater than $T_{filter}$ minus epsilon where epsilon is a predetermined parameter), the controlling agent may perform step 330. Otherwise, the controlling agent may perform step 326.

In step 330, the controlling agent may decrease the render pixel resolutions $M_r$ and $N_r$ to values that ensure (say with probability $P_Q$) that the frame render time $T_{render}$ for the next frame of graphics primitives will be less than the frame filter time $T_{filter}$. The programmer of a graphics application or perhaps the user may provide values to the controlling agent which determine probability $P_Q$. For example, the programmer may set a quality parameter which determined probability $P_Q$ according to a relation such as $P_Q=1-10^{-Q}$.

In step 340, the controlling agent may adjust the virtual pixel centers and the filter (support and function) based on the new values of the horizontal and vertical render pixel resolution. In particular, the controlling agent may adjust the virtual pixel centers so as to cover the new render pixel array, the scale (e.g. vertical and horizontal scale, or radial scale) of the filter support so as to cover a smaller extent in virtual screen space but the same extent as seen in video pixel space, and the scale of the filter function so as to weight samples with a contracted profile in virtual screen space but the same profile in video pixel space. These adjustments may include scaling the horizontal and vertical displacements of the virtual pixel centers, resetting the start position of the virtual pixel array, scaling one or more size parameters of the filter support, and scaling sample-related position arguments (e.g. sample radius, or sample dX and dY with respect to the filter center) before they hit the lookup table or coefficient evaluation circuitry. After step 340, controlling agent may return to step 310 and wait for render performance measurements on the next frame.

If, in step 325, the initial estimate of the frame render time $T_{frame}$ is less than the frame filter time $T_{filter}$, the controlling agent may perform step 326. In step 326, the controlling agent may implement any of a variety of control strategies to adjust the horizontal and vertical resolution of the render pixel array, and to adjust the virtual pixel array parameters and filter parameters accordingly. In particular, if $T_{render}$ is significantly smaller than $T_{filter}$, the controlling agent may allow the render pixel resolutions to increase toward their initial values. In some embodiments, the initial resolutions $M_r(0)$ and $N_r(0)$ are set equal to the video output resolutions $M_f$ and $N_f$ respectively.

The present invention contemplates a variety of software algorithms executable on the host processor and/or a processor embedded in graphics system 100 for controlling rendering performance as suggested by FIG. 9, and a variety of memory media for storing such software algorithms, and especially memory media for distributing such algorithms to customers/users.

Most of the discussion above has focused on a double-buffered sample buffer. However, in other embodiments, the sample buffer 104 may be triple-buffered, or N-fold buffered wherein N is a positive integer greater than two, at the expense of increased latency. In one alternative embodiment, the sample buffer may be single buffered.

The present invention contemplates a wide variety of rendering pipeline architectures. FIG. 3 presents one embodiment of a rendering pipeline. In a second set of embodiments, rendering engine 102 may subdivide triangles into subtriangles until the subtriangles are smaller than programmable size value (e.g. relative a render pixel).

Furthermore, the lighting computation 206 may be deferred until these ultimate triangles are obtained. Lighting intensity values (e.g. color intensity values) and texture values may be computed for the vertices of these ultimate subtriangles. The lighting intensity values and texture values at the vertices of the ultimate subtriangles may then be used to determine color intensity values for supersamples inside each ultimate subtriangle. For example, the lighting intensity values and texture values at the vertices of an ultimate triangle may be combined to determine a single RGB vector for the ultimate triangle. The single RGB vector may be assigned to all supersamples interior to the ultimate triangle. This scheme of using a constant color for the supersamples inside an ultimate triangle is referred to herein as "flat fill".

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphical processing system comprising:
   a texture memory configured to store texture elements;
   a rendering engine configured to render a stream of graphics primitives based on an array of render pixels, wherein said rendering engine is configured to determine a collection of said render pixels which intersect a first primitive in the received stream, and, for each render pixel in said collection, to (a) determine one or more texture values by accessing said texture memory, (b) compute sample values for samples interior to said render pixel and said first primitive based on said one or more texture values and based on primitive values associated with said first primitive;
   a sample buffer configured to store the sample values;
   a filtering engine configured to generate virtual pixel centers in a render screen space defined by the render pixel array, to read sample values from the sample buffer and compute a video output pixel for each virtual pixel center based on sample values corresponding to a neighborhood of the virtual pixel center;
   a controlling agent configured to decrease a horizontal resolution and a vertical resolution of the render pixel array to decrease frame rendering time for a subsequent frame of graphics primitives, wherein the controlling agent is further configured to adjust horizontal and vertical displacements between virtual pixel centers in response to the decreased horizontal and vertical resolutions of the render pixel array.

2. The graphical processing system of claim 1, wherein the primitive values include position coordinates of the primitive vertices and color intensity values associated with the primitive vertices.

3. The graphical processing system of claim 1, wherein the controlling agent is implemented as part of an application program executing on a host processor which operative couples to the rendering engine and filtering engine.

4. The graphical processing system of claim 1, wherein the controlling agent is implemented as part of an application programmer's interface executing on a host processor which operative couples to the rendering engine and filtering engine.

5. The graphical processing system of claim 1, wherein the filtering engine is configured to compute the video output pixel based on a filtering of the sample values corresponding to the neighborhood of the virtual pixel ceneter, wherein the controlling agent is further configured to decrease a size of a filter support used by the filtering agent in said filtering.

6. The graphical processing system of claim 1, wherein the filtering engine is configured to compute the video output pixel based on a filtering of the sample values corresponding to the neighborhood of the virtual pixel ceneter, wherein the controlling agent is further configured to contract a filter function used by the filtering agent in said filtering.

7. The graphical processing system of claim 1, wherein the rendering engine is configured to compute said sample values for said interior samples based on a linear interpolation of color intensity values at vertices of the first primitive and a multiplication of interpolated color values by corresponding ones of the one or more texture values.

8. The graphical processing system of claim 1, wherein the rendering engine is configured to compute render performance values including the number of render pixels for each texture accesses were performed in a given time period, wherein the controlling agent is configured to receive the render performance values and adjust the horizontal and vertical resolutions of the render pixel array based on said render performance values.

9. A method for processing graphics data, the method comprising:
   receiving a stream of graphics primitives;
   rendering the stream of graphics primitives based on an array of render pixels, wherein said rendering includes determining a collection of said render pixels which intersect a first primitive in the received stream, and for each render pixel in said collection:
      determining one or more texture values by accessing said texture memory;
      computing sample values for samples interior to said render pixel and said first primitive based one said one or more texture values and based on primitive values associated with said first primitive;
   storing the samples values in sample buffer;
   generating virtual pixel centers in a render screen space defined by the render pixel array;
   reading sample values from the sample buffer and computing a video output pixel for each virtual pixel center based on sample values corresponding to a neighborhood of the virtual pixel center in the render screen space;
   decreasing a horizontal resolution and a vertical resolution of the render pixel array to decrease frame rendering time for a subsequent frame of graphics primitives, and adjusting horizontal and vertical displacements between virtual pixel centers in response to the decreased horizontal and vertical resolution of the render pixels array.

10. The method of claim 9, wherein the primitive values include position coordinates of the primitive vertices and color intensity values of the primitive vertices.

* * * * *

UNITED STATES PATENT AND TRADEMARK OFFICE
CERTIFICATE OF CORRECTION

PATENT NO.    : 6,535,220 B2
DATED         : April 1, 2003
INVENTOR(S)   : Michael F. Deering et al.

It is certified that error appears in the above-identified patent and that said Letters Patent is hereby corrected as shown below:

<u>Title page,</u>
Item [75], please change "Mike Lavelle" to -- Michael G. Lavelle --.

Signed and Sealed this

Nineteenth Day of August, 2003

JAMES E. ROGAN
*Director of the United States Patent and Trademark Office*